UNITED STATES PATENT OFFICE.

JOHANN JUNGBLUTH, OF COLOGNE, GERMANY.

METHOD OF MANUFACTURING ARTIFICIAL STONE FOR STREET-PAVEMENTS.

SPECIFICATION forming part of Letters Patent No. 587,484, dated August 3, 1897.

Application filed September 16, 1896. Serial No. 606,039. (No specimens.)

*To all whom it may concern:*

Be it known that I, JOHANN JUNGBLUTH, a subject of the Emperor of Germany, residing in Cologne, Germany, have invented certain new and useful Improvements in Methods of Manufacturing Artificial Stone for Street-Pavements; and I do hereby declare the following to be a full, clear, and exact description of the invention, such as will enable others skilled in the art to which it appertains to make and use the same.

The object of the present invention is to provide an artificial stone for street-pavements and the like which can be simply and cheaply manufactured and which, besides having a high degree of hardness, and thus indestructibility, has a nice appearance and is not subject to changes of temperature.

The invention consists in the improved method of manufacturing artificial stone comprising a top layer, a binding medium, and a ground mass, substantially as will be hereinafter described, and finally embodied in the clause of the claim.

The top layer consists of asphalt-powder, which is brought to a seething temperature before being introduced into the stone-mold. The binding medium is composed of the three following differently-prepared substances: (a) Portland cement in a reduced state; (b) pulverized unslacked lime; (c) ground trass. The ground material consists of a stone of rocky hardness of porous nature and is employed in three different degrees or sizes: (a) one part in the shape of fine power; (b) one part in pieces of the size of peas—say about five millimeters in diameter; (c) one part in pieces of the size of small nuts of about ten to twelve millimeters in diameter.

The process for the use of the three chief masses or materials in order to obtain by their compression in a mold artificial stone of such qualities as have been unattainable hitherto as regards hardness, appearance, resistance to the influence of temperature, and indestructibility is as follows: The ground and the binding materials are at first introduced into a mold in a warm and slightly-dampened state, whereas the top material following afterward is introduced in quite a hot state, very near the seething-point. The mold is then closed and the substances therein subjected to a high atmospheric pressure, which latter causes a compression and substantial amalgamation of the said substances.

It is to be specially pointed out that the ground and binding materials are introduced in only a very slightly wet state, as this is essential in order to retain their complete power of setting nearly to the time when they are placed in the mold. The real setting—that is to say, the setting of the artificial stone itself—then takes place in a natural way after the stone has been taken out of the mold, and generally requires a number of days.

The purpose of the porous rocky stone is to give by its porosity an opportunity to the top material to combine ultimately with it, so that a non-porous strong material is produced which is capable of resisting even the hardest shocks and when laid in mixed layers gives an indestructible surface of good appearance.

The purpose of the action of especially high pressure—say about three hundred atmospheres—after the three principal masses have been placed in the mold is, besides producing a close compression of the pulverized and grain-like ingredients, chiefly to produce a stone in which the ground mass is combined or amalgamated with the asphalt top mass into one. By this means is attained a complete mutual penetration of the ground and top layers in the separation plane of the two layers, so that a subsequent separation, breaking off, or loosening of the separate ingredients, even when subjected to the greatest strains, is completely avoided. The purpose of the top layer is to obtain a surface which in respect of strength answers to all the requirements of heavy street traffic, and on account of the layer being comparatively thin costs less than if the whole stone were prepared, as hitherto, of such top layer.

When taken out of the mold, the stones or slabs are exposed to a water-spray, which has the advantage of completing the setting, under the action of the oxygen of the air, in a uniform and slow manner in about twenty-seven days, so that the hardening effect penetrates even into the inmost parts of the artificial stone.

Having thus described my invention, what I claim as new, and desire to secure by Letters Patent, is—

The process of forming an artificial stone, having a top layer of pulverized asphalt, consisting; first, in mixing the ingredients to form the base and slightly dampening the mixture; second, in mixing the binding medium and laying the same on the base in a slightly warmed and dampened condition; third, in laying on said binding medium the top layer of asphalt warm; fourth, in compressing the three layers together under high pressure, and, fifth, in subjecting the compressed mass to a spray of water, substantially as described.

In testimony whereof I have hereto set my hand in the presence of the two undersigned witnesses.

JOHANN JUNGBLUTH.

Witnesses:
SOPHIE NAGEL,
WILLIAM H. MADDEN.